United States Patent [19]
Kondo

[11] Patent Number: 4,722,003
[45] Date of Patent: Jan. 26, 1988

[54] HIGH EFFICIENCY CODING APPARATUS
[75] Inventor: Tetsujiro Kondo, Kanagawa, Japan
[73] Assignee: Sony Corporation, Tokyo, Japan
[21] Appl. No.: 932,274
[22] Filed: Nov. 19, 1986
[30] Foreign Application Priority Data
Nov. 29, 1985 [JP] Japan ............................. 60-268817
[51] Int. Cl.⁴ ............................................. H04N 7/13
[52] U.S. Cl. ....................................... 358/135; 375/27
[58] Field of Search ................. 358/135, 136, 133, 13; 375/27

[56] References Cited
U.S. PATENT DOCUMENTS
4,656,500 4/1987 Mori ...................................... 358/13
4,677,479 6/1987 Hatori .................................. 358/135

Primary Examiner—Howard W. Britton
Attorney, Agent, or Firm—Lewis H. Eslinger; Alvin Sinderbrand

[57] ABSTRACT

In an apparatus for coding digital video data in a block format, the dynamic range information is generated from maximum and minimum values of plural picture elements in a block, and the minimum value is subtracted from each of the digital data to generate modified digital video data. A distribution table of the dynamic range information during a predetermined period, such as plural fields, is generated, and the encoding bit number for each block is determined based on the distribution table and the capacity of the transmission line such as a VTR. The modified data is encoded with such encoding bit number and transmitted with a first additional code per block formed of the minimum value and a signal based on the dynamic range information and with a second additional code for the predetermined period.

6 Claims, 18 Drawing Figures

HIGH EFFICIENCY CODING APPARATUS

FIELD OF THE INVENTION

This invention relates to a highly efficient coding apparatus and, is directed more particularly, to a high efficiency coding apparatus for compressing the avarage bit number per picture element of picture data such as a digital television signal.

BACKGROUND OF THE INVENTION

Methods of encoding a television signal have been proposed in which, with a view to narrowing a transmission band, the average bit number per picture element or a sampling frequency have been reduced.

In an encoding method for reducing a sampling frequency, it has been proposed to thin the picture data to one half by subsampling and by transmitting subsampling points and flags for indicating the positions of the subsampling points to be used in the interpolation (i.e., for indicating which of the data of the subsampling points lying above and below or to the left and right of interpolation points should be employed).

A DPCM (differential PCM) encoding method has been known for reducing the average bit number per picture element. The DPCM method pays attention to the facts that there is a high correlation between picture elements of a television signal and that the difference between adjacent picture elements is small, and transmits this difference signal through quantization.

Another encoding method of reducing the average bit number per picture element involves dividing one field picture into small blocks and then transmitting an average value, a standard deviation and an encoding code of one bit in one-to-one correspondence with each picture element.

In the encoding method for reducing a sampling frequency through the use of a subsampling technique, there is the possibility that folded distortion may occur, because the sampling frequency is reduced to one half.

The DPCM method is burdened with the problem that some error propagates toward subsequent encoding.

The method for performing the encoding in a block unit has the disadvantage that block distortion occurs at the boundary between blocks.

The present applicant has proposed a highly efficient coding apparatus for obtaining a dynamic range defined by a maximum value and a minimum value of plural picture elements contained in a two-dimensional block and performing encoding adaptive to the dynamic range, for example as described in copending U.S. patent application Ser. No. 06/809,742 having a common assignee herewith. In that application, deterioration of the picture quality of a reproduced picture is substantially avoided, because a reversible encoding technique is employed. However, when blocks with large dynamic ranges appear continuously, the bit number for encoding increases to exceed the transmission-allowable capacity. As a result, the transmission at a predetermined rate cannot be achieved.

SUMMARY OF THE INVENTION

Therefore, an object of the present invention is to provide a highly efficient coding apparatus which is free from the above described problems encountered in the prior art.

Another object of the present invention is to provide a highly efficient coding apparatus for enabling the total amount of data during a predetermined period to be less than the capacity of the transmission means through which the data is transmitted.

A further object of the present invention is to provide a highly efficient coding apparatus capable of shortening the time required for performing a buffering operation.

According to one aspect of the invention, there is provided a highly efficient coding apparatus in which plural picture fields are divided into a plurality of blocks which are processed separately for initially obtaining, the dynamic range of the block and each minimum level thereof.

A distribution table of the dynamic range during the plural picture fields is generated. The encoding bit number is determined based on the distribution table of the dynamic range DR and the capacity of the transmission line which may be constituted by a VTR, in which case the capacity is the total data amount recordable during the plural picture fields. Modified digital video data of each block is generated by subtracting the respective minimum level from the digital video data of each picture element and is encoded with the determined encoding bit number. The encoded data, a first additional code per block formed of at least two of the maximum level, minimum level and a signal based on the dynamic range DR, and a second additional code for plural picture fields, such as the maximum distortion of the parameter of the threshold values of the dynamic range determining the boundary of the plural encoding bit numbers constitute the total data transmitted. The transmitted total data amount can consequently be controlled so that it is within the capacity of the transmission line. The time required for a buffering operation can be shortened using the distribution table.

The above, and other objects, features and advantages of this invention, will be apparent in the following detailed description which is to be read in connection with the accompanying drawings in which corresponding parts, in the several views are identified by the same reference numerals.

Figure 1:
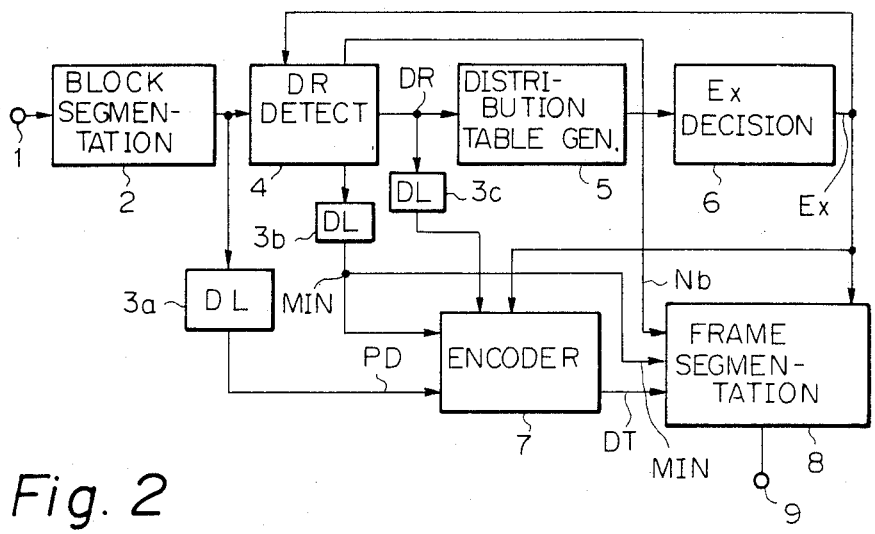
FIG. 1 is a block diagram of the transmitted section of apparatus according to one embodiment of this invention.

DETAILED DESCRIPTION OF PREFERRED EMBODIMENTS OF THE INVENTION a. Structure on the transmission side Referring to FIG. 1, eight bits, for example, is supplied through to an input terminal 1 television signal obtained by quantizing one sample into eight bits, for example, is given to an input terminal to a block segmentation circuit 2.

The input digital television signal is converted by the block segmentation circuit 2 into a continuous signal for every three dimensional block, which is a unit of encoding. In the embodiment, one block is defined as having the three dimensions (four lines×four picture elements×four frames=64 picture elements. The output signal of the circuit 2 is supplied to a delay circuit 3a and a dynamic range-detection circuit 4. The circuit 4 detects a dynamic range DR and a minimum value MIN for every block. Simultaneously, the detection circuit 4 obtains a number Nb of bits required for quantization on the basis of the detected DR and a maximum distortion Ex.

The dynamic range DR is supplied to a distribution table generating circuit 5. The circuit 5 provides a summation of the distribution of all the dynamic ranges DR every four frames. The summed distribution is supplied to a maximum-distortion-decision circuit 6. The circuit 6 decides the maximum distortion Ex (the circuit 6 is referred to hereinafter as the "Ex decision circuit 6"). The maximum distortion Ex is the maximum error value occurring at the time of decoding.

The distribution of the dynamic ranges assumes a pattern showing a characteristic of picture information in four frame periods. For instance, in the case of a frequently moving picture or a picture having a fine picture pattern, the distribution of comparatively large dynamic ranges DR is great, and the distribution of the dynamic ranges DR does not concentrate at a certain point. In contrast, in the case of an infrequently moving picture or a picture having a large picture pattern, the distribution of small dynamic ranges is great, and the distribution concentrates at a certain point. To compare the former with the latter, the amount of information to be transmitted in the case of a frequently moving picture or a picture having a fine pattern is greater than the amount of information to be transmitted in the case of an infrequently moving picture or a picture having a large picture pattern.

The maximum distortion Ex is determined in dependence on the amount of transmission information detected from the distribution of the dynamic ranges DR. When the amount of transmission information is large, the maximum distortion Ex is judged to be large, whereas if the amount of transmission information is small, the maximum distortion Ex is determined to be small. Based on the maximum distortion Ex and the distribution of the dynamic ranges already obtained, the number of all bits required in four frame periods is obtained. When this number of all bits and additional data are sent during the four frame periods, it is verified whether or not the transmission capacity of a transmission line has been exceeded. For instance, in the case of a transmission capacity of 64 MBPS (megabits/sec), the transmission capacity for four frame periods becomes 64×(4/30)=8.5M bits. The maximum distortion Ex is determined by the Ex decision circuit 6 so that it does not exceed this transmission capacity.

The delay circuit 3a delays picture element data derived from the block segmentation circuit 2. Picture element data PD from the delay circuit 3a is quantized by an encoder 7 to be converted into an encoded code DT having a number of compressed bits.

To the encoder 7 are also supplied the above-mentioned dynamic range DR for every block and the minimum value MIN for every block which are delayed by delay circuits 3c and 3b, respectively. Further, the maximum distortion Ex for every four frames is supplied from circuit 6 to encoder 7. Picture element data PDI after eliminating the minimum value is developed by subtracting the minimum value MIN from the picture element data PD. The picture element data PDI is quantized.

In the encoder 7, an encoded code DT is developed for indicating to which of plural level ranges, formed by dividing the dynamic range of each block, picture element data PDI belongs. The number of bits of the encoded code DT is determined by the dynamic range DR and the maximum distortion Ex. The encoder 7 has a ROM (read only memory) for quantization corresponding to sixteen kinds of maximum distortions Ex ranging from (Ex=0) to (Ex=15), for example as mentioned later.

The encoded code DT is supplied to a frame segmentation circuit 8 which further receives the number Nb of bits (three bits) and the minimum value MIN (eight bits) required as additional codes for every block, and the maximum distortion Ex supplied to the circuit 8 as an additional code every four frames. The frame segmentation circuit 8 performs the processing for error correction and encoding for the encoded code DT and the mentioned additional codes, and adds a synchronization signal. Transmission data is obtained at an output terminal 9 of the circuit 8, and the transmission data is sent out to the transmission line such as a digital channel.

As has been described before, although the encoded code DT has a variable bit number every block, the bit number of the block is necessarily determined from the necessary bit number Nb in the additional codes. As a result, despite the adoption of a variable length code, there is an advantage that no redundant code for showing the separation of data in the transmission data is needed.

b. Structure on the reception side

Figure 2:
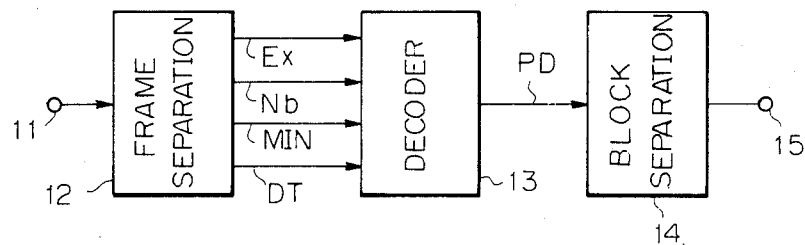
FIG. 2 is a block diagram showing the reception section of apparatus according to the invention.

As shown in FIG. 2, received or reproduced data is supplied from an input terminal 11 to a frame separation circuit 12. In the circuit 12, the encoded code DT, and the additional codes Ex, Nb and MIN are separated, and simultaneously error correction processing is performed. Such encoded code DT and additional codes are fed from circuit 12 to a decoder 13.

The decoder 13 performs processing opposite to that of the encoder 7 at the transmission side. More specifically, the data PDI after the elimination of an eight-bit minimum level is decoded and added to the minimum value MIN to decode the picture element data PD. The output data PD from the decoder 13 is supplied to a block separation circuit 14. Contrary to the block segmentation circuit 2 at the transmission side, the block separation circuit 14 is a circuit for converting decoded data of the block order into an order similar to that for television signal scanning. A decoded television signal is produced at an output terminal 15 of the block separation circuit 14.

c. Block segmentation circuit

Figure 3:
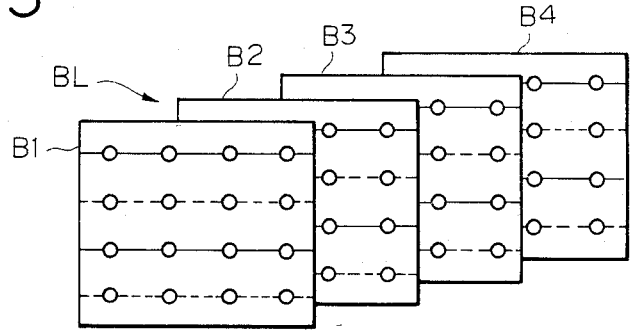
FIG. 3 is a schematic diagram to which reference will be made in describing a block used as a processing unit for encoding.

Referring initially to FIG. 3, a block, which is a unit of encoding, will be explained. In FIG. 3, BL indicates one block consisting of two-dimensional areas B1, B2, B3 and B4, each of which belongs to a respective one of four frames, and in which solid lines indicate lines in odd fields, while broken lines indicate lines in even fields. The areas B1, B2, B3 and B4 (of four lines × four picture elements) are composed of four picture elements contained respectively in four lines of each frame. Therefore, one block consists of sixty-four picture elements (4×4×4=64).

Figure 4:
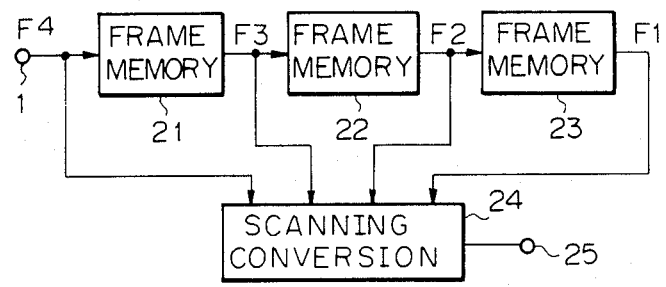
FIGS. 4 and 5 are schematic diagrams for explaining one example of a block formation circuit.

FIG. 4 shows one example of the above-mentioned block segmentation circuit 2. Frame memories 21, 22 and 23 are cascaded to the input terminal 1. Picture element data of the present frame F4 and picture element data of previous frames F3, F2 and F1 taken out of the frame memories 21, 22 and 23 respectively, are supplied to a scanning conversion circuit 24.

Figure 5:
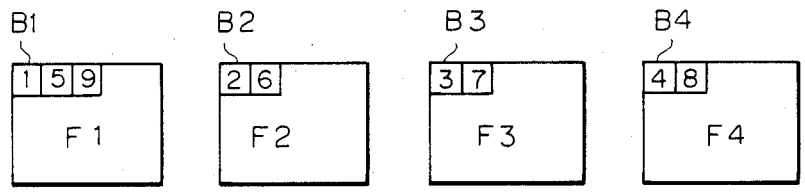

Picture element data of the corresponding two-dimensional areas B1, B2, B3 and B4 in four frames are sequentially obtained at an output terminal 25 of the scanning conversion circuit 24. More specifically, as shown in FIG. 5, the corresponding areas B1, B2, B3 and B4 in the four successive frames F1, F2, F3 and F4 are provided at output 25 in the order shown by numerals thereon.

d. Dynamic range-detection circuit

Figure 6:
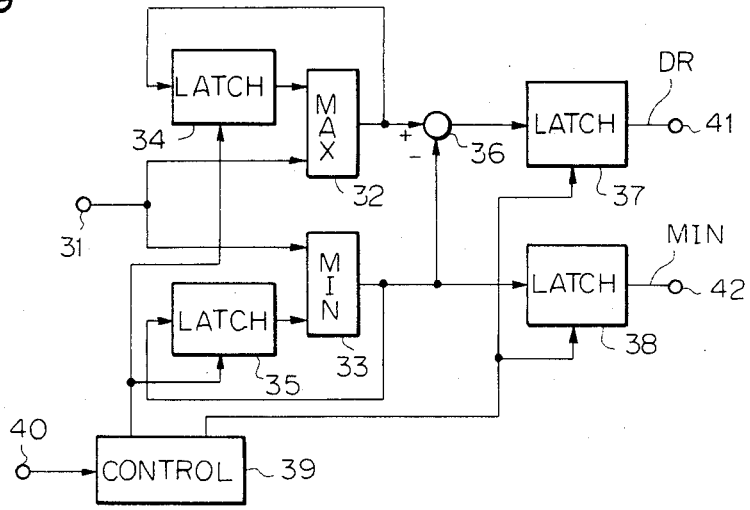
FIG. 6 is a block diagram of one example of a dynamic range-detection circuit.

FIG. 6 shows a construction of one example of the dynamic range-detection circuit 4. To an input terminal 31 are sequentially supplied picture element data in a region, of the successive frames forming every block from the block segmentation circuit 2 as mentioned before. The picture element data from the input terminal 31 is fed to selectors 32 and 33. The selector 32 selects and outputs the data having the larger level from between the picture element data of an input digital television signal and the output data of a latch 34. The selector 33 on the other hand selects and outputs data having the smaller level from between the picture element data of the input digital television signal and the output data of a latch 35.

The output data of the selector 32 is supplied to one input of a subtraction circuit 36 and also returned to the latch 34. The output data of the selector 33 is supplied to another input of the subtraction circuit 36 and to a latch 38 and is also returned to the latch 35. A latch pulse is provided from a control circuit 39 to the latches 34 and 35. Timing signals such as a sampling clock in synchronism with the input digital television signal and a synchronization signal are fed to the control circuit 39 from a terminal 40. The control circuit 39 also supplies latch pulses to the latches 37 and 38 at predetermined timings.

The contents of the latches 34 and 35 are initialized at the beginning of each block. All "0's" are initially set in the latch 34, while all "1's" are initially set in the latch 35. The maximum level of the picture element data of a particular block, which is sequentially given, is stored in the latch 34. Also, the minimum level of the picture element data of the same block, which are supplied sequentially, is stored in the latch 35.

Upon completion of the detection of the maximum and minimum levels in one block, the maximum level of the corresponding block appears at the output of the selector 32. On the other hand, the minimum level of the corresponding block is produced at the output of the selector 33. Upon completion of the detection of the maximum and minimum levels in one block, the initial setting of the latches 34 and 35 is performed again.

The dynamic range DR of each block obtained by the subtraction of the maximum level MAX from the selector 32 and the minimum level MIN from the selector 33 is produced at the output of the subtraction circuit 36. These dynamic ranges DR and minimum level MIN are latched into the latches 37 and 38 by the latch pulses from the control circuit 39. The dynamic range DR of each block is obtained at an output terminal 41 of the latch 37, while the minimum level MIN of each block is obtained at an output terminal 42 of the latch 38. Also, provided in the dynamic range-detection circuit, but not shown on FIG. 6, is a circuit for detecting the necessary bit number Nb determined by the DR and the maximum distortion Ex.

e. Description of distribution table generating circuit

Figure 7A:
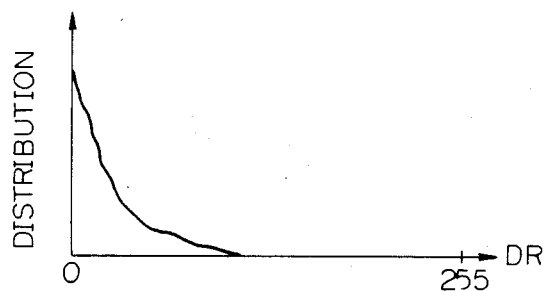
FIGS. 7A and 7B are schematic diagrams to which reference will be made in explaining distribution.
Figure 7B:
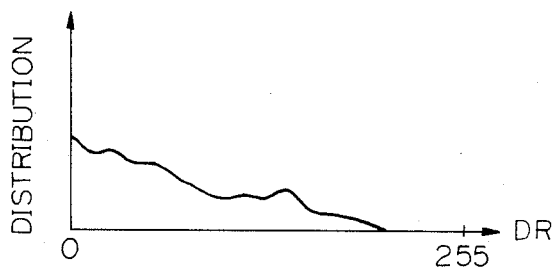

In the distribution table generating circuit 5, the distribution of 256 dynamic ranges DR of 0, 1, 2, - - - 255 in the case of eight bits is summed up every four frames. FIGS. 7A and 7B show two contrasting examples of distribution.

The pattern of the distribution shown in FIG. 7A indicates the case where the distribution of small dynamic ranges DR is greater. A pattern of distribution as is shown in FIG. 7A is provided with respect to still pictures, pictures with less moving portions and large-patterned pictures. In such case, since the bit number required for quantization becomes small, the maximum distortion Ex is small. On the other hand, the pattern of frequency distribution shown in FIG. 7B shows the case where the dynamic ranges are dispersed. A pattern of distribution as is shown in FIG. 7B is produced with respect to pictures with many moving portions and pictures of fine picture pattern. In this latter case, because the bit number necessary for quantization increases, the maximum distortion Ex becomes great.

Given the maximum distortion Ex, the bit number needed for quantization is necessarily defined. As an example, the necessary bit number Nb and a decoded value in the case of (Ex=4) are illustrated in the following table. In this example, the magnitude of the decoded value is supposed to have a fixed value as shown in the table given below. As a result, there is no need to transmit the dynamic range as an additional code. Rather, merely transmitting the minimum value (eight bits) and the necessary bit number Nb is enough.

| DR | Nb | Decoded Value |
|---|---|---|
| 0~8 | 0 | 4 |
| 9~17 | 1 | 4, 13 |
| 18~35 | 2 | 4, 13, 22, 31 |
| 36~71 | 3 | 4, 13, 22, 31, 40, 49 . . . |
| 72~143 | 4 | . . . |
| 144~255 | 5 | . . . |

As mentioned previously, since the dynamic range DR is detected for every block, the necessary bit number is the same for each picture element in one block. In the case of (Ex=4) and with respect to picture elements of a particular block (DR=34) (MIN=100), the level ranges are divided into four ranges of (0~8), (9~17), (18~26) and (27~35) and two-bit quantization is performed by the four level ranges represented by [(00), (01), (10), (11)]. For instance, with a level (131) of a picture, the minimum value MIN is eliminated to convert the level into (31). Because the level (31) is included in the level range (27~35), it is quantized into an encoded code DT of (11).

When the dynamic range DR is divided into ranges each containing nine levels, as in this example, the minimum value (eight bits) MIN and the necessary bit number Nb (four bits) are sufficient for the additional codes for each block.

On the other hand, in a system in which the number of ranges into which the dynamic range is to be divided is determined so as to be adaptable to each dynamic range DR on a case-by-case basis, any two of the minimum value (eight bits), the DR (eight bits) and the maximum value (eight bits) are needed as the additional codes. In the latter system, the data compression rate becomes low, but decoding distortion is greatly improved as compared with the first described system.

The total bit number of encoded codes DT in four frame periods is detected on the basis of data showing the distribution of the dynamic ranges DR and the maximum distortion Ex. The total bit number in the four frame periods is calculated from the total bit number of the encoded codes DT and that of the additional codes (maximum distortion Ex, the necessary bit number Nb every block, minimum value MIN every block). The Ex decision circuit 6 determines the maximum distortion Ex so that the total bit number in the four frame periods does not exceed the transmission capacity. Specifically, from (Ex=0), the values of the maximum distortion Ex are made to increase one by one like [1, 2, 3, 4, 5, - - -, 15], and the maximum distortion provided when the above-mentioned total bit number lies within the transmission capacity is selected as the one to be used. The value of the maximum distortion Ex is selected to be as small as possible.

At the reception side, the decoding is performed on the basis of the maximum distortion Ex and the necessary bit number Nb in reception data to output a decoded level. In the Table I (Ex=4), values [4, 13, 22, 31] are used as decoded levels in the case of the necessary bit number Nb of two bits. In the above-described case of (DR=34) (DT=11), a decoded level (31) is obtained, and (100) is added to the decoded level (31) to produce a decoded output of a level of (131).

Figure 9:
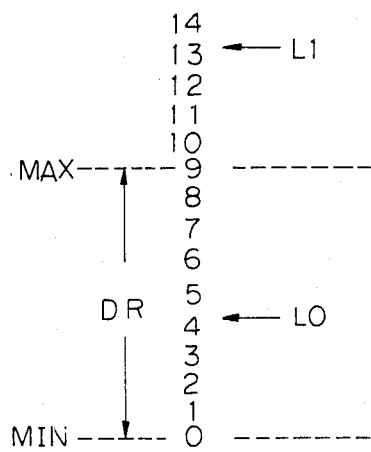
FIGS. 9 and 10 are schematic diagrams to which reference will be made in describing respective examples of quantization.

FIG. 9 shows a specific example of the encoding and decoding of this one embodiment. The necessary bit number is one bit in the case of the maximum distortion (Ex=4) and the dynamic range DR (9) of the data PDI after the elimination of the minimum value, as can be understood from Table I. With this one bit, an encoded code DT of (0) is output when the value of the data PDI lies in the range (0~8), and an encoded code DT of (1) is output with the value (9) of the data PDI. At the reception side, (L0=4) and (L1=13) are employed as decoded levels.

Figure 10:
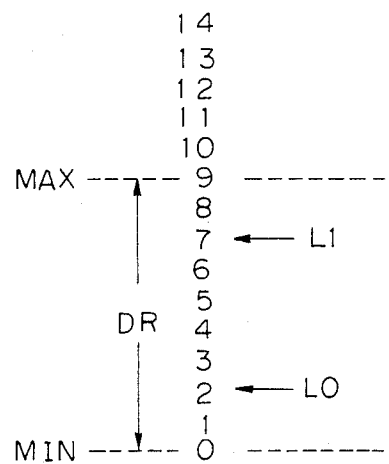

On the other hand, in the case of a system in which the decoding is adapted to the dynamic range for each block, the DR can be recognized from the received data. In an example similar to FIG. 9, the dynamic range DR is recognized as (9), and the necessary bit number corresponding to the DR is determined. Also, since the number of times the dynamic range is to be divided is determined from that necessary bit number, the division by two is effected as shown in FIG. 10. Each of the central levels (L0=2) (L0=7) of the respectively divided regions is assumed to be a decoded level. As is apparent from the comparison of FIG. 9 with FIG. 10, the quantization distortion in the latter case is small.

f. Encoder

Figure 8:
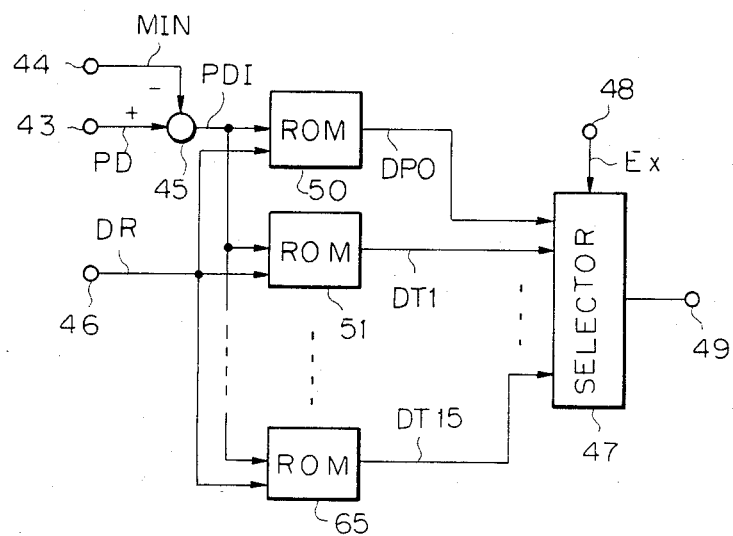
FIG. 8 is a block diagram of one example of an encoder.

The encoder 7 will now be described with reference to FIG. 8. In FIG. 8, sixteen ROMs (read only memories) indicated at 50, 51, - - -, 65 have respective data-conversion tables stored therein for quantization of the respective maximum distortions (Ex=0) (Ex=1) - - - (Ex=15). Picture data PD from the delay circuit 3 is supplied through an input terminal 43 to one input of a subtraction circuit 45, and simultaneously the minimum value MIN from an input terminal 44 is supplied to the other input of the circuit 45. Data PDI from which the minimum value has been eliminated is obtained from the output of this subtraction circuit 45.

The dynamic range DR for every block applied to an input terminal 46 and the data PDI from subtraction circuit 45 are supplied to ROMs 50 to 65. Quantization is carried out with the bit number determined by predetermined maximum distortion and the dynamic range DR so that encoded codes DT0 to DT15 corresponding to the data PD are output from the ROMs 50 to 65, respectively. The encoded codes DT0 to DT15 are supplied to a selector 47. The maximum distortion Ex is applied to the selector 47 from a terminal 48, and an encoded code corresponding to the maximum distortion Ex is selected by the selector 47 to be delivered at an output terminal 49.

g. Modification

In the above-described embodiment, the so-called linear quantization technique, that is, quantizing so that the maximum distortion is made constant, has been employed. However, a non-linear quantization technique may be adopted using a visual characteristic that the deterioration is not noticeable in a large block even if the maximum distortion is large.

Such variable quantization performed in the encoder 7 will now be described with reference to FIG. 11. T1, T2, T3 and T4 are threshold levels or values for determining the allocation bit numbers, respectively. Among those levels, there is the relationship (T4<T3<T2<T1). In the case of DR=(T4−1), only the maximum value MAX and the minimum value MIN are transmitted as shown at A of FIG. 11, and a middle level L0 is employed as a decoded level. As a result, if the dynamic range DR is (T4−1), as shown in A of FIG. 11, the quantization width becomes Δ0. In the case of (0≦DR≦T4−1), the allocation bit number is 0.

Figure 11:
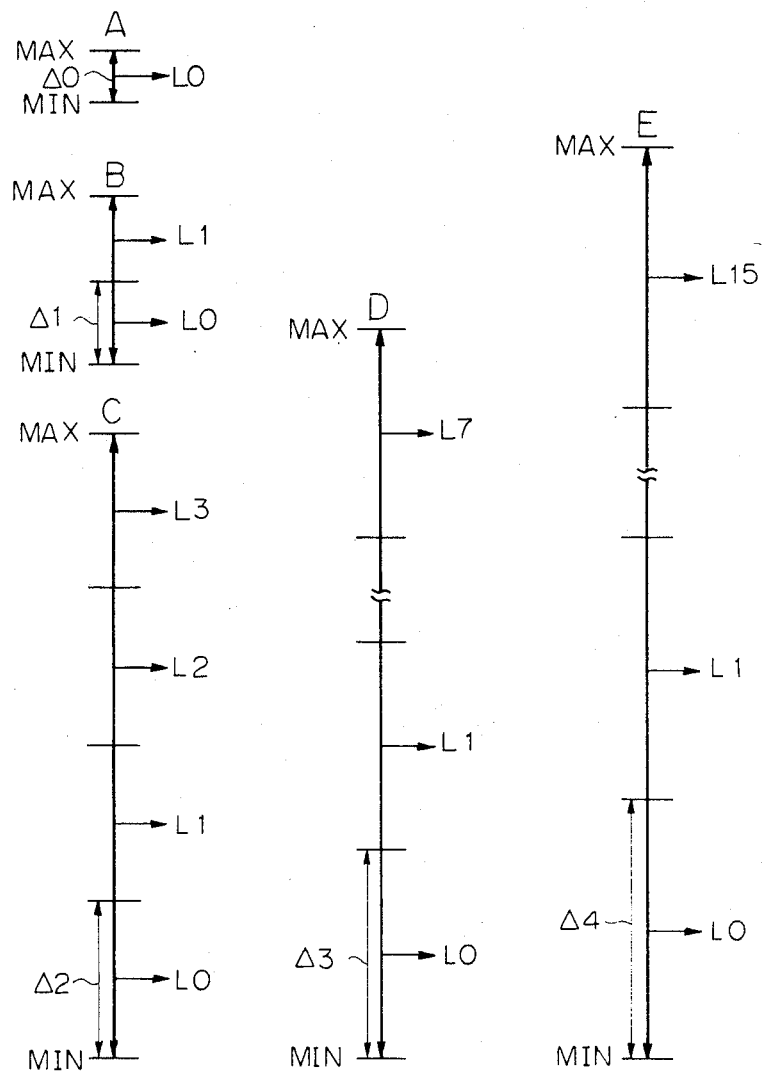
FIG. 11 is schematic diagrams to which reference will be made in describing non-linear variable length encoding.

Referring to B of FIG. 11, which shows the case of DR=T3−1, the allocation bit number is one bit when there is the relationship (T4≦DR≦T3−1). Consequently, a detected dynamic range DR is divided into two level ranges, and the level range to which picture element data PDI belongs is examined using the quantization width Δ1. A code signal of either "0" corresponding to the level range is assigned, and the decoded level is made to be L0 or L1.

In the variable length encoding shown in FIG. 11, non-linear quantization is carried out so that the quantization width Δi (Δ0<Δ1<Δ2<Δ3<Δ4) is increased in that order as the DR is increased. With the nonlinear quantization, the maximum distortion is made small in a block with a small DR, which provides noticeable encoding distortion, whereas the maximum distortion is made large in a block having a large DR. This contributes to the enhancement of compression rate.

In the case of DR=(T2−1), a detected DR is divided into four level ranges as shown at C of FIG. 11, and two bits (00), (01), (10) and (11) are allotted to the respective level ranges. The middle levels of the four ranges become the decoded levels L0, L1, L2 and L3. Therefore, the level range to which the data PDI belongs, is examined using the quantization width Δ2. In the case of (T3≦DR≦T2−1), the allocation bit number becomes two bits.

In the case of DR=(T1−1), a detected DR is divided into eight level ranges, as shown at D in FIG. 11, and three bits (000) (001) ... (111) are allotted to the respective ranges. The middle levels of the eight ranges become the decoded levels L0, L1, ... L7. For this reason, the quantization width is made to be Δ3. In the case of (T2≦DR≦T1−1), the allocation bit number is three bits.

In the case of DR=255, a detected DR is divided into 16 level ranges as shown at E of FIG. 11, and four bits (0000), (0001), ... (1111) are allotted to the respective ranges. The middle levels of the 16 ranges are the decoded levels L0, L1, ... L15. The quantization width consequently becomes Δ4. In the case of (T1≦DR≦255), the allocation bit number is four bits.

For the threshold values T1 to T4, for example, the following eleven sets, which are differentiated by the parameter codes Pi, are prepared at the maximum transmission rate (2 bits/picture element).

TABLE II

|     | T4 | T3 | T2  | T1  |
| --- | --- | --- | --- | --- |
| P1  | 0  | 3  | 11  | 39  |
| P2  | 2  | 7  | 23  | 63  |
| P3  | 4  | 11 | 31  | 79  |
| P4  | 6  | 15 | 39  | 103 |
| P5  | 8  | 19 | 47  | 119 |
| P6  | 10 | 23 | 55  | 135 |
| P7  | 12 | 27 | 63  | 151 |
| P8  | 14 | 33 | 79  | 183 |
| P9  | 16 | 37 | 87  | 207 |
| P10 | 18 | 41 | 103 | 255 |
| P11 | 20 | 71 | 255 | /   |

Among the threshold values shown in Table II, the threshold value set designated by the parameter code P1 can provide the minimum quantization distortion. In the distribution table generation circuit 5, the distribution of the dynamic ranges DR of all blocks in one frame is obtained. By sequentially applying the threshold value sets to this distribution starting at the set show at the parameter code P1, ADRC (adaptive dynamic range coding) is performed to calculate all the bit numbers (i.e., the generated information amount) of the code signal DT. Such generated information amount is compared with an already known data threshold value so that a threshold value set, which provides as little distortion as possible, can be determined within the range that the generated information amount does not exceed the data threshold value.

Figure 12:
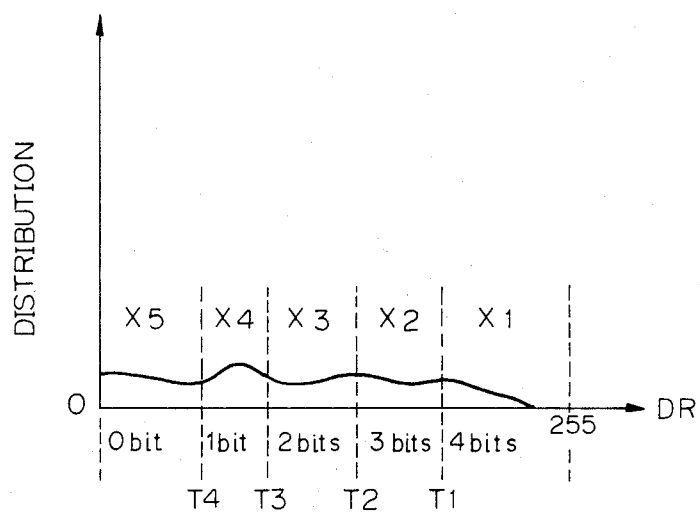
FIGS. 12 and 13 are graphs for describing the distribution.

In FIG. 12 which shows an example of the distribution, the abscissa indicates the dynamic ranges DR ranging from 0 to 255, whereas the ordinate indicates the distribution. x1, x2, x3, x4 and x5 represent block numbers included in five ranges of the dynamic ranges which have been divided by the threshold values T1 to T4. Since 0 bit is allotted to the blocks having the dynamic ranges equal to or less han (T4−1), the block number x5 does not contribute to the generated information amount. As a result, this amount can be obtained by 4x1+3x2+2x3+x4.

The generated information is compared with the data threshold value. When the generated information amount exceeds the data threshold value, a set having a larger threshold value is applied, and the generated information amount is calculated similarly. To perform the above operation, processing is required for obtaining the sum of the distribution within each range for every preestablished threshold value set, for multiplying the allocation bit number by the obtained sum, and for adding the multiplied value. However, if such processing steps are carried out each time the threshold value sets are changed, it takes time to finally obtain an optimum threshold value set.

Figure 13:
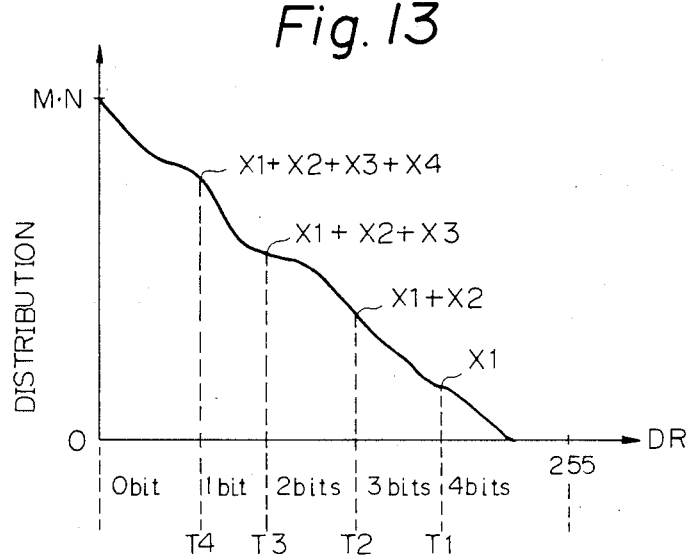

In another embodiment, the distribution shown in FIG. 12 is converted into an integrating type shown in FIG. 13 so that the generated information amount corresponding to different threshold value sets can be calculated at higher speed so as to reduce the time required until the optimum threshold value set is obtained.

As can be understood from FIG. 13, an integrating type distribution graph is obtained by sequentially integrating the generation distributed of smaller dynamic ranges starting at the distribution of the maximum DR. As a result, the integrating distribution up to the threshold value T1 becomes x1. Similarly, (x1+x2), (x1+x2+x3) and (x1+x2+x3+x4) are the integrating distributions up to the threshold values T2, T3 and T4, respectively.

The generated information amount for the threshold values T1 to T4 is obtained as 4(x1−0)+3[(x1+x2)−x1]+2[(x1+x2+x3)−(x1+x2)-]+1[(x1+x2+x3+x4)−(x1+x2+x3)]=4x1+3x2+2x3+1x4. Once the integrating type distribution graph (integrating type distribution table) shown in FIG. 13 is created, the generated information amount can be immediately obtained by the sum of four numbers when the threshold value sets are updated.

Figure 14:
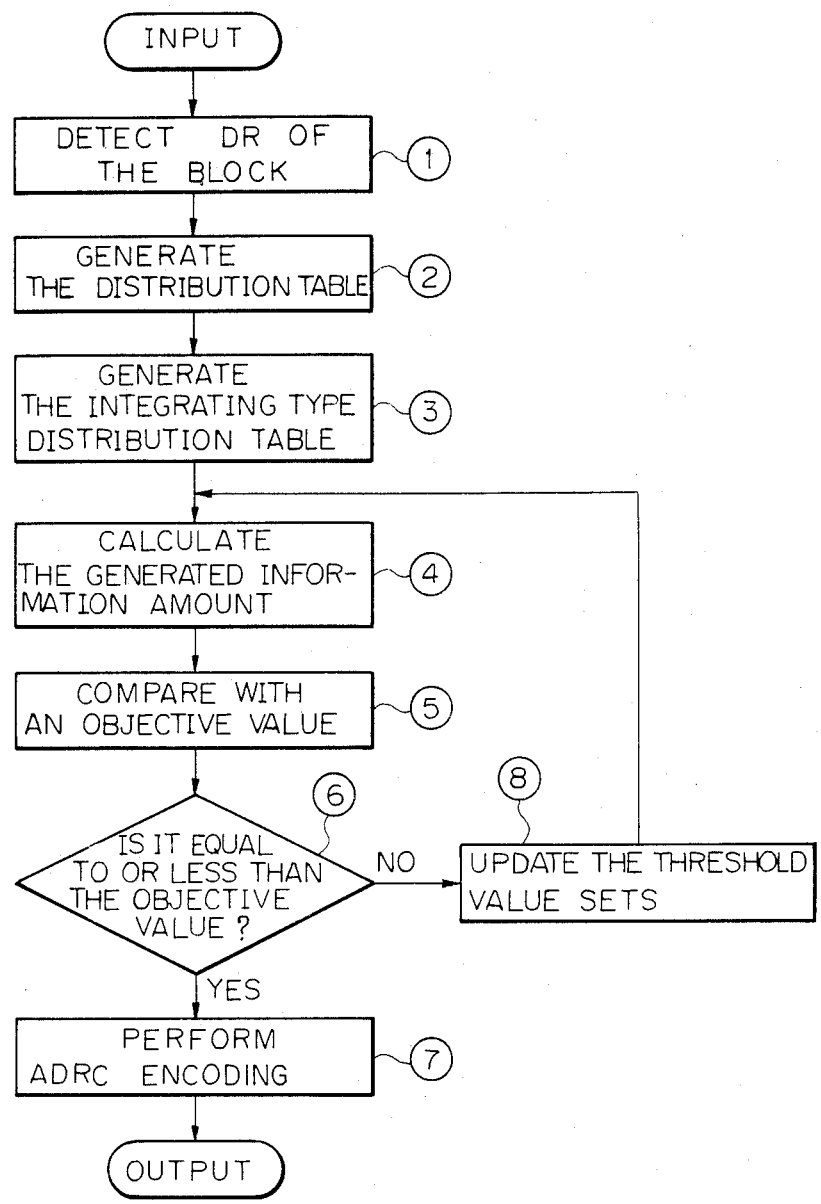
FIG. 14 is a flow chart for explaining the buffering operation.

FIG. 14 is a flow chart to which reference will be made in describing the above-described buffering operation. First, the dynamic ranges DR of all blocks in one picture, for example, one frame are detected (step ①). The distribution table (refer to FIG. 12) of the DRs in one frame is then generated (step ②). This distribution table is next converted into the corresponding table of the integrating type (refer to FIG. 13) (step ③). The generated information for the threshold value sets is calculated in step ④. In this case, the calculation in step ④ starts at the threshold value set which provides the minimum quantization distortion (the threshold value set assumed by the parameter code P1).

The generated information amount obtained is compared with an objective value (data threshold value) (step ⑤). The objective value is the maximum value of the rate of transmission of data (for example, two bits/-picture element). This comparison result is judged at the step ⑥. In the case where the generated information amount is equal to or less than the objective value, the adaptive dynamic range coding ADRC is effected using the threshold value sets (step ⑦). If the generated information amount exceeds the objective value, the threshold value sets are updated (step ⑧), and steps ④, ⑤ and ⑥ are repeated with respect to the new threshold value sets which provide larger quantization distortion.

Though the dynamic range DR, the minimum MIN, the parameter code Pi and a redundant code for error correction are transmitted in addition to the code signal DT, these data can be neglected in the examination of the transmission rate by giving an offset to the objective value, since each of the data has a variable length.

Figure 15:
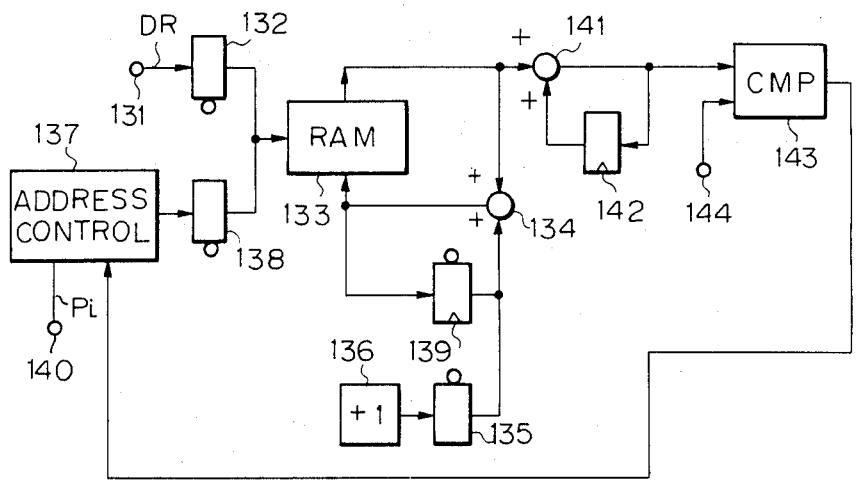
FIGS. 15 and 17 are block diagrams illustrating buffering circuits used in apparatus embodying the invention.

FIG. 15 shows an example of a circuit for effecting the above-described buffering operation in another embodiment of the invention. This circuit is employed in place of the distribution table generating circuit 5 and the Ex decision circuit 6 shown in FIG. 1. In FIG. 15, a dynamic range DR is supplied from an input terminal 131. To a RAM (random access memory) 133 as an address signal through a resister 132 having an output control function. The RAM 133 has addrees (0 to 255) and, in its initial state, all the memory contents of the RAM are cleared.

Data read out from the RAM 133 is supplied to an adder 134. The output data from adder 134 is supplied to the RAM 133 as data input. Dynamic ranges DRs of each block are supplied to the RAM 133 via the resistor 132 after the initialization has been completed. After data is read out of an address of the RAM 133, the output data of the adder 134 is written in the same address. Every time the address corresponding to the supplied DR is accessed, data at that address is incremented, since the output of a (+1) generator 136 is supplied to the adder 134 through a resistor 135. Therefore, at the time when the supplying of the DRs of all blocks in one frame has been completed, the DR distribution table is stored in RAM 133.

When the DR distribution table has been stored in RAM 133, resistors 138 and 139 are brought into output-enabling states, the resistor 135 is brought into an output-disabling state, and the integrating type distribution table is generated. For such purpose, an address signal from an address controller 137 is supplied to the RAM 133 through the resistor 138. This address signal is used for the decrement of (−1) from 255.

Data read out of the RAM 133 is added at adder 134 to data previously read and stored in the resister 139. Since the output data of the adder 134 is written at the same address in RAM 133 as that from which data has been read, the integrating type distribution table is stored in the RAM 133 at the time the address has been decremented to 0.

To calculate the generated information amount, the threshold values T1, T2, T3 and T4, which provide the minimum distortion, are sequentially supplied to the RAM 133 from the address controller 137. With the supply of the threshold value T1, the distribution x1 is read from the RAM 133 and supplied to an adder 141. The output signal from adder 141 is fed back thereto through a resistor 142 and also supplied to a comparator 143. The comparator 143 compares a data threshold value (objective value) from a terminal 144 with the generated information value from the adder 141.

When the threshold value T2 following the threshold value T1 is supplied frm controller 137 to the RAM 133, (x1+x2) is read out from the RAM 133 and added to x1 stored in the register 142 at the adder 141. The addition output of adder 141 is again fed to the resistor 142. By the supply of the threshold value T3 to the RAM 133, (x1+x2+x3) is then read out of the RAM 133 and added to (2x1+x2) stored in the resistor 142 at the adder 141. Further, when the threshold value T4 is given to the RAM 133, the output read out of the RAM 133 and the output of the resistor 142 are added at the adder 141. As a result, the output of the adder 141 is 4x1+3x2+2x3+1x4. This output of the adder 141 is in fact the generated information amount corresponding to the threshold values T1 to T4.

The comparator 143 generates a "0+ comparison output signal when the generaed information amount exceeds the data threshold value, whereas the comparator 143 produces a "1" comparison output signal when the generated informtion amount does not exceed the data threshold value. These comparison output signals are supplied to the address controller 137. The controller 137 stops updating the threshold data value in response to the "1" comparison output, and produces the parameter code Pi indicative of the threshold value at that time to an output terminal 140.

The processing for converting the above-described distribution table of the dynamic ranges into one of the integrating type and the processing for determining the optimum threshold value can be executed in the vertical blanking period. Further, reduction of processing time can be achieved by the adoption of the structure for allowing the capacity of the RAM 133 to be quadrupled and the integrating distribution to be output in parallel.

Figure 16:
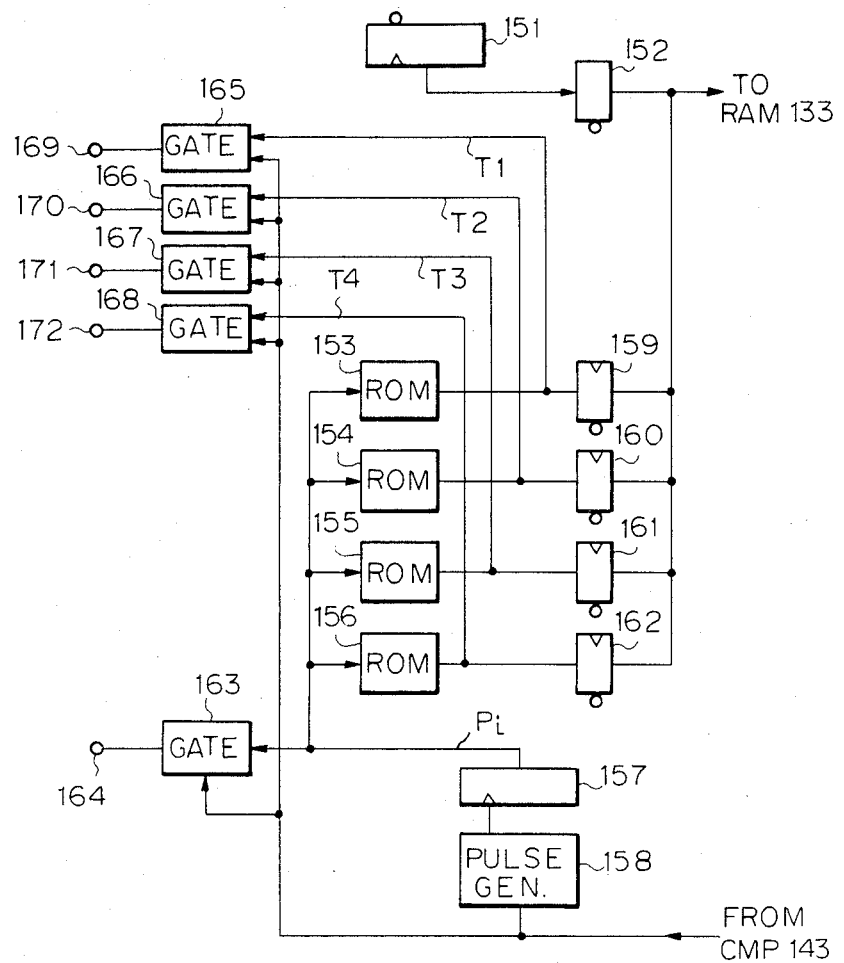
FIG. 16 is a block diagram showing details of an address controller.

FIG. 16 shows a detailed example of the address controller 137 in which an address counter 151 generates an address for decrementing (−1) from 255 at the time of making the integrating type distribution table.

The address from the counter 151 is supplied to the RAM 133 through a resistor 152 having an output control function.

In a ROM 153 are stored 11 kinds of the threshold value T1, for example. In other ROMs 154, 155 and 156 are stored 11 kinds of the threshold values T2, T3 and FT4, respectively. A four-bit parameter code Pi generated at an address counter 157 is supplied to the ROMs 153 to 156 as an address. The counter 157 is incremented by a pulse signal from a pulse generator 58. The comparison output signal of the comparator 143 in FIG. 15 is fed to the pulse generator 158, and a pulse signal having a predetermined period is supplied from the pulse generator 158 to the address counter 157 while said comparison output signal is "0". Consequently, threshold values are sequentially read out of the ROMs 153 to 156 until the generated information amount becomes equal to or smaller than the data threshold value. The threshold values read from the ROMs 153 to 156 are supplied to resistors 159, 160, 161 and 162, respectively each of which has an output control fumction. In response to an output control signal, the resisters 159, 160, 161 and 162 sequentially output threshold values in that order starting at the resistor 159.

The parameter code Pi generated at the address counter 157 is supplied to an output terminal 164 via a gate circuit 163. The threshold values T1 to T4 read from the ROMs 153 to 156 are supplied to output terminals 169, 170, 171 and 172 through gate circuits 165, 166, 167 and 168. The gate circuits 163 and 165 to 168 are enabled or continued in "ON" states in response to the "1" comparison output signal from comparator 143. As a result, the optimum threshold value and the parameter code Pi for specifying this threshold value are produced at the output terminals 164 and 169 to 172, respectively. Such threshold value and code Pi are employed for the ADRC.

The above example of the buffering can be applied to the ADRC for three-dimensional blocks. If the three-dimensional blocks are composed of two two-dimensional areas belong to two frames, for instance, the number of picture elements in one block is doubled. In the ADRC for three-dimensional blocks, the presence or absence of movements between the two-dimensional areas is detected with a view to enhancing the compression rate. In the presence of movements, the encoding for picture element data in the two two-dimensional areas, or all the picture element data in a block is carried out. On the other hand, in the absence of movements, a processing effected for encoding picture element data in one two-dimensional area. As a result, the ratio of the generated information amount at a still or non-moving part and moving part of a picture becomes (1:2).

Figure 17:
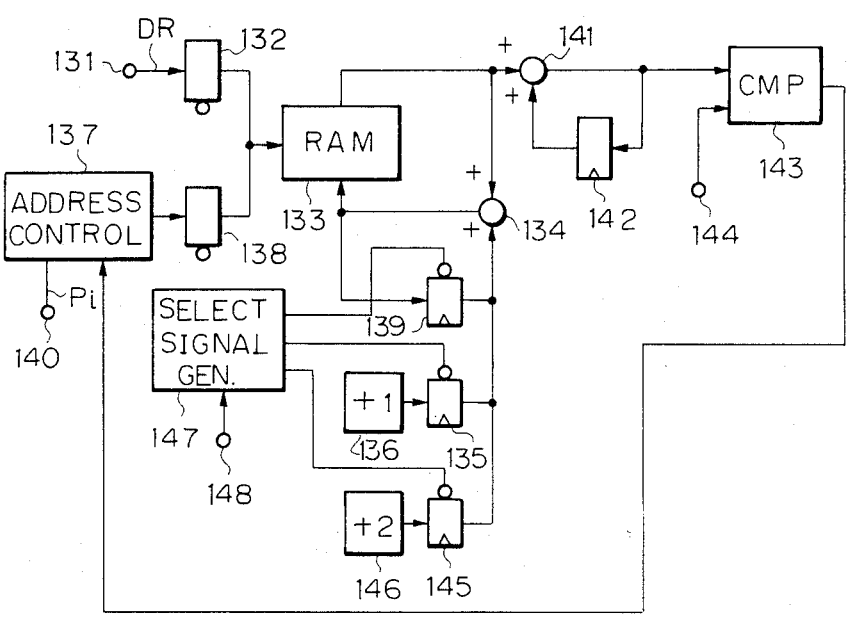

Another arrangement of the buffering circuit when the invention is applied to the above-described three-dimensional ADRC is illustrated in FIG. 17. In such buffering circuit a resistor 145 having an output control function, a (+2) generator 146 and a selection signal generator 147 are added to the circuit previously described with reference to FIG. 15. A flag for indicating the presence or absence of movement is supplied from a terminal 148 to the generator 147. The resistors 135, 139 and 145 are controlled by a selection signal from the selection signal generator 147.

In the operation for forming the distribution table in the RAM 133, in response to a movement flag applied to terminal 148, the register 145 is conditined in its output-enabling state to supply (+2) to adder 134 at the moving part, and, at the still part, the resister 135 is contioned in its output-enabling state to supply (+1) to the adder 134. With this control, the distribution table of the dynamic ranges is formed in the RAM 133.

It is to be noted that one block of data may be taken out by a circuit composed of the combination of a frame memory, a line delay circuit and a sample delay circuit.

Moreover, this invention permits the transmission rate to be constant. However, slight adjustment for the data amount to be transmitted may be achieved using a buffer memory of small capacity.

According to the invention, the amount of data to be transmitted can be substantially reduced as compared with the amount of original data, and the transmission band can be narrowed. Also, the invention is advantageous in that the degradation of picture quality is substantially avoid, because original picture element data can be almost perfectly recovered from data received for stationary picture portions or for picture portions having relatively narrow ranges of data change. Further, since the dynamic range is determined in one-to-one correspondence with each block, the response is satisfactory even at a transient portion such, an edge portion across which a great change in data occurs.

The invention enables the effective use of the transmission capacity of a transmission line, since the transmission rate of the encoded output is made substantially constant by performing encoding adaptive to the amount of generated information. Also, in this invention, since a quantization bit number adaptive to the dynamic range in a block is selected, a reproduced picture of excellent quality with uniform distortion can be produced. In addition, the invention allows variable length encoding without any codes for data separation to thereby perform further compression.

Although the present invention has been described with reference to the preferred embodiments, it will be appreciated by those skilled in the art that various modifications, substitutions, and changes may be made therein without departing from the spirit and scope of the invention as defined by the following claims.

What is claimed is:

1. A highly efficient coding apparatus for coding digital video in a block format allowing video data compression for transmission by data transmission means having a predetermined transmission capacity, comprising:
   first detecting means for detecting a maximum value of the digital video data of plural picture elements in a block;
   second detecting means for detecting a minimum value of said digital video data of plural picture elements in said block;
   means for subtracting said minimum value from the digital video data for each of said picture elements to generate modified digital video data;
   means for generating a distribution table of said dynamic range informatin during a predetermined period;
   means for determining an encoding bit number for each block during said predetermined period from said distribution table and said predetermined transmission capacity of said data transmission means;
   encoding means for encoding said modified digital video data with said encoding bit number and
   means for transmitting an output of said encoding means, a first additional code for each block formed of at least two of said maximum value, minimum value and a signal based on said dynamic range information, and a second additional code for each said predetermined period.

2. A highly efficient coding apparatus as claimed in claim 1, wherein said means for generating includes a random access memory addressed by said dynamic range information, and an address controller for alternatively controlling addressing of said random access memory.

3. A highly efficient coding apparatus as claimed in claim 1, wherein said means for determining includes calculating means for calculating the total bit number during said predetermined period on the basis of said distribution table, and comparator means for comparing said total bit number with said predetermined transmission capacity of said data transmission means.

4. A highly efficient coding apparatus as claimed in claim 3, wherein said means for generating includes first generating means for generating a first distribution table of said dynamic range information, and second generating means for generating a second distribution table of integrating type from said first distribution table.

5. A highly efficient coding apparatus as claimed in claim 4, wherein said calculating means includes setting means for setting a threshold value of the dynamic range information for determining a boundary of plural bit numbers.

6. A highly efficient coding apparatus as claimed in claim 5, wherein said means for determining includes means responsive to said comparator means for controlling said setting means so that said threshold value is changed, in response to an output of said comparator means.

* * * * *

UNITED STATES PATENT AND TRADEMARK OFFICE
CERTIFICATE OF CORRECTION

PATENT NO. : 4,722,003

DATED : January 26, 1988

INVENTOR(S) : Tetsujiro Kondo

It is certified that error appears in the above-identified patent and that said Letters Patent is hereby corrected as shown below:

Column 1, line 7, change "avar-" to --aver--.

Column 2, line 14, change "the" second occurence to --each--;
   same line, change "each" to --the--;
   line 33, after "numbers" insert --,--;
   line 47, change "transmitted" to --transmitting--;
   line 66, change "Fig. 11 is" to
   --Figs. 11A to 11E are--.

Column 3, line 23, after "dimensions" delete "("
   and insert --,--.

Column 5, line 24, after "23" insert --,--.

Column 6, line 54, insert --TABLE I--.

Column 8, line 59, after ""0"" insert --or "1"--;
   line 65, change "nonlinear" to --non-linear--.

Column 9, line 50, change "show" to --shown--;
   line 67, change "han" to --than--.

Column 11, line 13, change ". To" to --to--;
   line 59, change "frm" to --from--;
   line 61, change "register" to --resistor--;
   line 67, change "given" to --supplied--.

UNITED STATES PATENT AND TRADEMARK OFFICE
CERTIFICATE OF CORRECTION

PATENT NO. : 4,722,003
DATED : January 26, 1988
INVENTOR(S) : Tetsujiro Kondo

It is certified that error appears in the above-identified patent and that said Letters Patent is hereby corrected as shown below:

```
Column 12, line  2 after "is" insert --,--;
           line  3, after "fact" insert --,--;
           line  5, change ""0+ " to --"0"--;
           line  6, change "generaed" to --generated--.
           line  9, change "informtion" to --information--;
           line 20, after "Further" delete ",";
           line 21, delete "the" second occurence;
           line 34, change "FT4" to --T4--;
           line 37, change "58" to --158--;
           line 48, change "fumction" to --function--;
           line 68, change "belong" to --belonging--.
column 13, line 26, change "register" to --resister--
           same line, change "conditined" to --conditioned--;
           line 44, change "avoid" to --avoided--;
           line 50, after "such" insert --as--.
```

UNITED STATES PATENT AND TRADEMARK OFFICE
CERTIFICATE OF CORRECTION

PATENT NO. : 4,722,003

DATED : January 26, 1988

INVENTOR(S) : Tetsujiro Kondo

It is certified that error appears in the above-identified patent and that said Letters Patent is hereby corrected as shown below:

Column 14, line 20, change "informatin" to --information--.

Signed and Sealed this

Twenty-fourth Day of January, 1989

*Attest:*

DONALD J. QUIGG

*Attesting Officer*  *Commissioner of Patents and Trademarks*